No. 614,442. Patented Nov. 22, 1898.
L. M. CAMPAU.
BICYCLE STAND.
(Application filed Dec. 6, 1897.)
(No Model.)
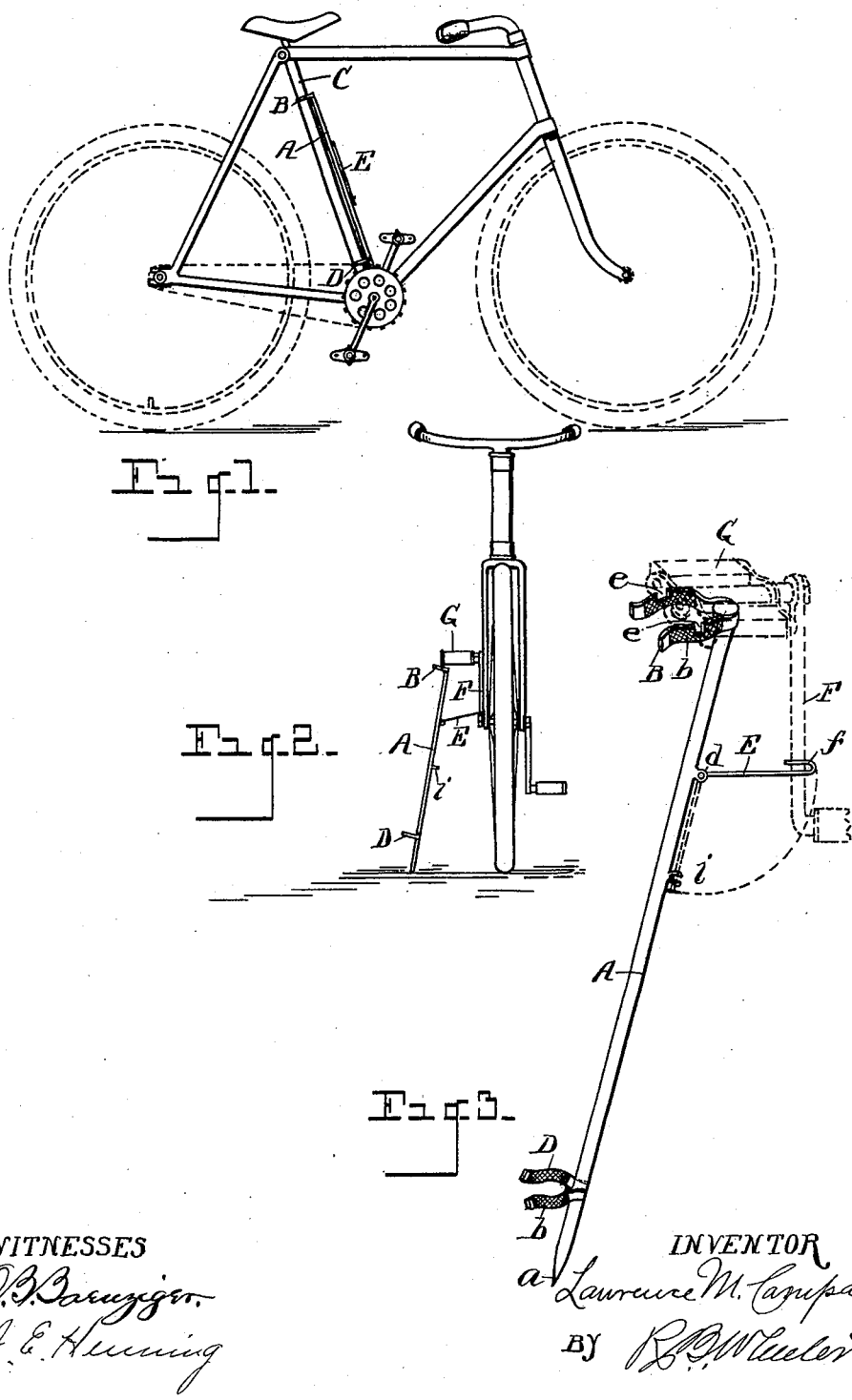
WITNESSES
INVENTOR
Lawrence M. Campau
BY
Attorneys.

UNITED STATES PATENT OFFICE.

LAWRENCE M. CAMPAU, OF DETROIT, MICHIGAN.

BICYCLE-STAND.

SPECIFICATION forming part of Letters Patent No. 614,442, dated November 22, 1898.

Application filed December 6, 1897. Serial No. 660,849. (No model.)

*To all whom it may concern:*

Be it known that I, LAWRENCE M. CAMPAU, a citizen of the United States, residing at Detroit, in the county of Wayne, State of Michigan, have invented certain new and useful Improvements in Bicycle Stands or Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in portable bicycle stands or supports; and it consists in the construction and arrangement of parts hereinafter set forth, and pointed out particularly in the claims.

The object of the invention is to provide simple, light, and effective means of supporting a bicycle in upright position when not in use, and which when the bicycle is in service may be detachably mounted on the frame thereof without interfering with the rider or greatly adding to the weight of the bicycle, which object is attained by the device illustrated in the accompanying drawings, in which—

Figure 1 is a side elevation of the bicycle, showing my improved support detachably mounted on the seat-mast thereof. Fig. 2 is a front elevation showing the position of the stand when supporting a bicycle. Fig. 3 is an enlarged perspective of the stand or support engaging the pedal in position of supporting the machine.

Referring to the letters of reference, A designates a rod or tube of one continuous piece, which constitutes the stand or support and which is provided at its lower end with a sharpened point $a$ to prevent slipping. At the upper end of the tube A is a spring-clasp B, brazed or otherwise secured thereto, composed of a strip of spring-steel which encircles said tube and is provided with outwardly-curved embracing ends adapted to receive the seat-mast C of the bicycle-frame and clamp said mast with sufficient force to retain said support in place thereon, as shown in Fig. 1. The lower end of said support is held in place by a similar spring-clasp D, which is in like manner attached thereto and which embraces the lower end of the seat-mast. Said spring-clasps B and D are provided with a covering of rubber or other material $b$ to prevent marring the frame of the bicycle.

It will be seen on referring to Fig. 3 that the edges of the spring-clasp B are provided with registering notches $e$, which are adapted to receive the end piece of the pedal G of the bicycle, as shown by dotted lines in said figure.

In the use of this improved device in supporting the bicycle one of the pedals of the machine is turned to the uppermost position, when the support A is placed thereunder, the pedal engaging in the notches $e$ in the upper edges of the clamp B, which prevents the pedal from slipping from said support and insures the maintenance of the bicycle in an upright position, as shown in Fig. 2. The support stands at an angle, and the machine leans slightly toward the support, which forms a brace therefor.

To prevent the bicycle from running in either direction when sustained by the support A, I employ an arm E, which is pivoted at $d$ to the support A and is provided at its outer or free end with a hook $f$, adapted to engage the crank F of the bicycle, as shown by dotted lines in Fig. 3. By this means the crank is locked to said support and the bicycle securely retained in position. When said arm E is not in use, it may be swung downward and secured in the engaging clasp $i$, carried on the support A, as also shown in Fig. 3.

It will now be understood that when desired to stand the bicycle when not in use the support A may be readily removed from the frame of the machine and placed under the pedal, as shown, while the pivoted arm E is caused to engage the crank, affording a firm support for the machine and which when not in service may be quickly replaced upon the frame of the bicycle in such manner as to be entirely out of the way of the rider, affording a light and convenient stand or support, which may be carried at all times upon the bicycle without materially adding to the weight thereof.

Having thus fully set forth my invention, what I claim as new, and desire to secure by Letters Patent, is—

1. In a bicycle stand or support, the combination with the bicycle and its pedal, of the support or stand of such length as to extend between the ground and pedal when the latter is in its raised position, the clamping-arms at the upper end of said support having notches therein that receive the plate of said pedal to retain it in said position as set forth.

2. In a bicycle stand or support the combination with the supporting rod or tube, the spring-clamp at the end thereof, said clamp having notches therein adapted to engage the pedal of the bicycle, and the arm pivoted to said rod or tube and adapted to engage the crank, substantially as set forth.

In testimony whereof I affix my signature in presence of two witnesses.

LAWRENCE M. CAMPAU.

Witnesses:
EDGAR S. WHEELER,
MARY A. MARTIN.